United States Patent
Bell et al.

(10) Patent No.: US 7,268,693 B2
(45) Date of Patent: Sep. 11, 2007

(54) TOWED VEHICLE LIGHTING MODULE

(75) Inventors: Joseph A. Bell, Markle, IN (US);
Matthew J. Gumbel, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 209 days.

(21) Appl. No.: 11/051,054

(22) Filed: Feb. 4, 2005

(65) Prior Publication Data

US 2006/0187078 A1    Aug. 24, 2006

(51) Int. Cl.
*G08B 23/00* (2006.01)

(52) U.S. Cl. .................. 340/815.4; 340/425.5; 340/431; 340/438; 340/463; 340/468; 340/472; 340/473; 340/479; 340/475

(58) Field of Classification Search ........... 340/815.4, 340/425.5, 431, 438, 463, 464, 465, 467, 340/468, 472, 473, 475, 479
See application file for complete search history.

(56) References Cited

U.S. PATENT DOCUMENTS

| | | | |
|---|---|---|---|
| 4,286,309 A | 8/1981 | Rasinski | |
| 5,438,490 A | 8/1995 | Woodbury | |
| 5,725,228 A | 3/1998 | Livingston | |
| 5,909,891 A | 6/1999 | Swart et al. | |
| 6,087,777 A | 7/2000 | Long | |
| 6,218,952 B1 * | 4/2001 | Borland et al. | 340/641 |
| 6,232,722 B1 | 5/2001 | Bryant et al. | |

* cited by examiner

*Primary Examiner*—Daryl C Pope
(74) *Attorney, Agent, or Firm*—Jeffrey P. Calfa; Gerald W. Askew; Susan L. Lukasik

(57) ABSTRACT

Control of an accessory lighting array for temporary installation on a towed vehicle through the controller area network of a towing vehicle is effected through access to the controller area network over a bus extension, and connection of an accessory controller to the bus extension for decoding network status messages for operation.

8 Claims, 3 Drawing Sheets

TOWED VEHICLE LIGHTING MODULE

BACKGROUND OF THE INVENTION

1. Technical Field

The invention relates to lighting for towed vehicles and more particularly to a modularized system which may be operated from the towing vehicle's controller area network or other serial communications network.

2. Description of the Problem

Delivery drivers for recreational vehicles and school busses commonly tow a car behind the vehicle being delivered for the return trip. Doing so has required mounting on the towed vehicle an array of signal lights enabling following vehicles to see activation of brake lights, turn signals and tail lights. Conveying the activation signals from the towing vehicle to the array mounted on the towed vehicle has often been done by splicing wires running from the lamps of the array into the towing vehicles electrical harness. This has the potential of damaging the electrical harness if not carefully done. With the increasing use of sophisticated electronic control and monitoring systems the potential for generating bogus fault signals and damage to the vehicle electronic control systems grows with crude modifications of the vehicle electrical harness.

SUMMARY OF THE INVENTION

According to the invention there is provided a lighting system for installation on a towed vehicle for control from a towing vehicle. The lighting system includes an array of lamps installable on the towed vehicle. The towing vehicle is conventionally provided with a controller area network or other serial communications network having a network bus with an access point. A network bus extension is attached to the network bus at the access point. An electrical system controller generates vehicle lamp status signals on the network bus in response to vehicle operator requests. A controller connected to the network bus extension is programmed to be reponsive to the vehicle lamp status signals for turning selected lamps of the array of lamps on and off. The array could also be removed and the wiring spliced into the towed vehicle directly.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
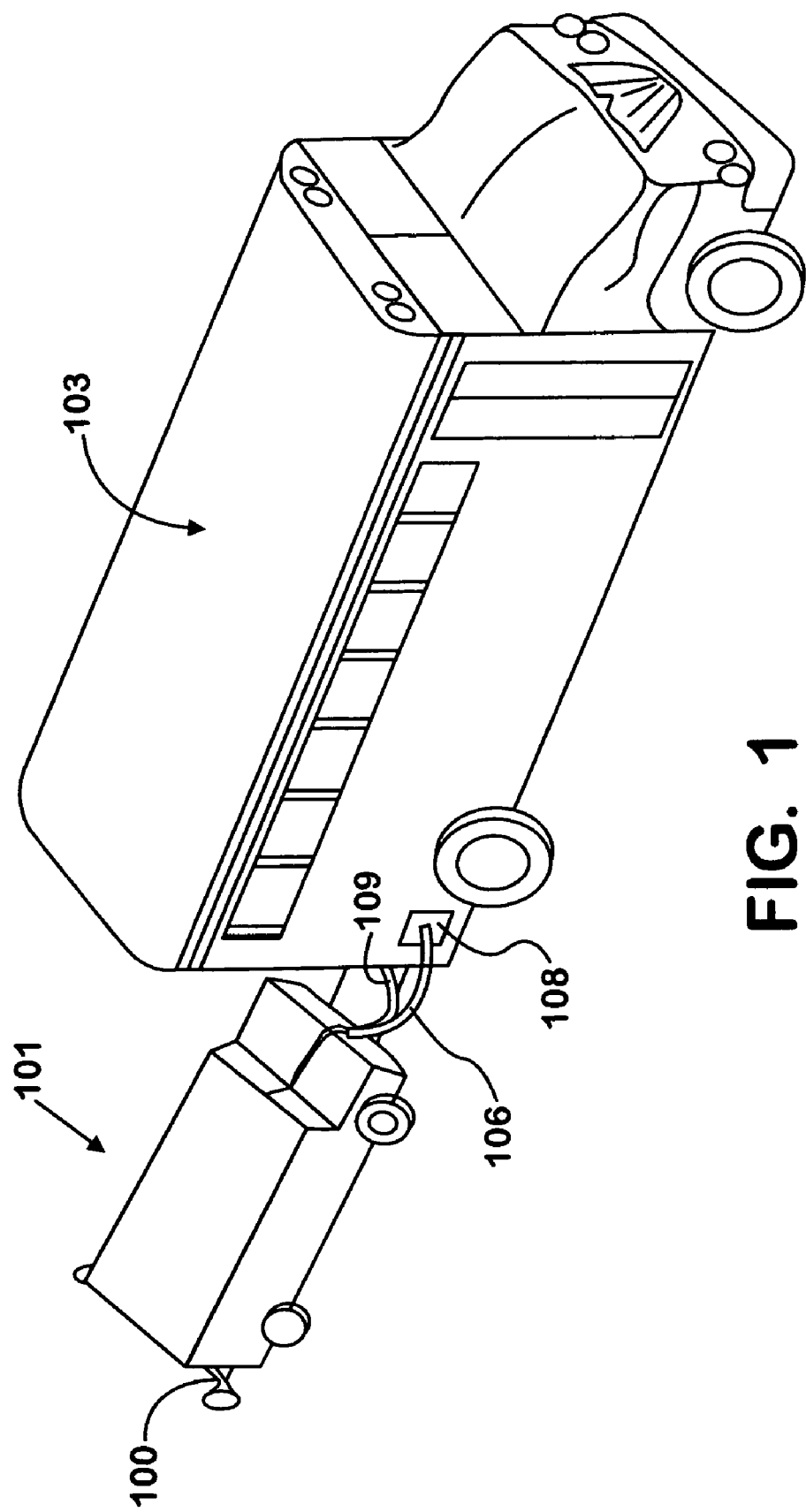
FIG. 1 is a perspective view of two vehicles attached to one another in tandem for towing of one vehicle by the other.
Figure 2:
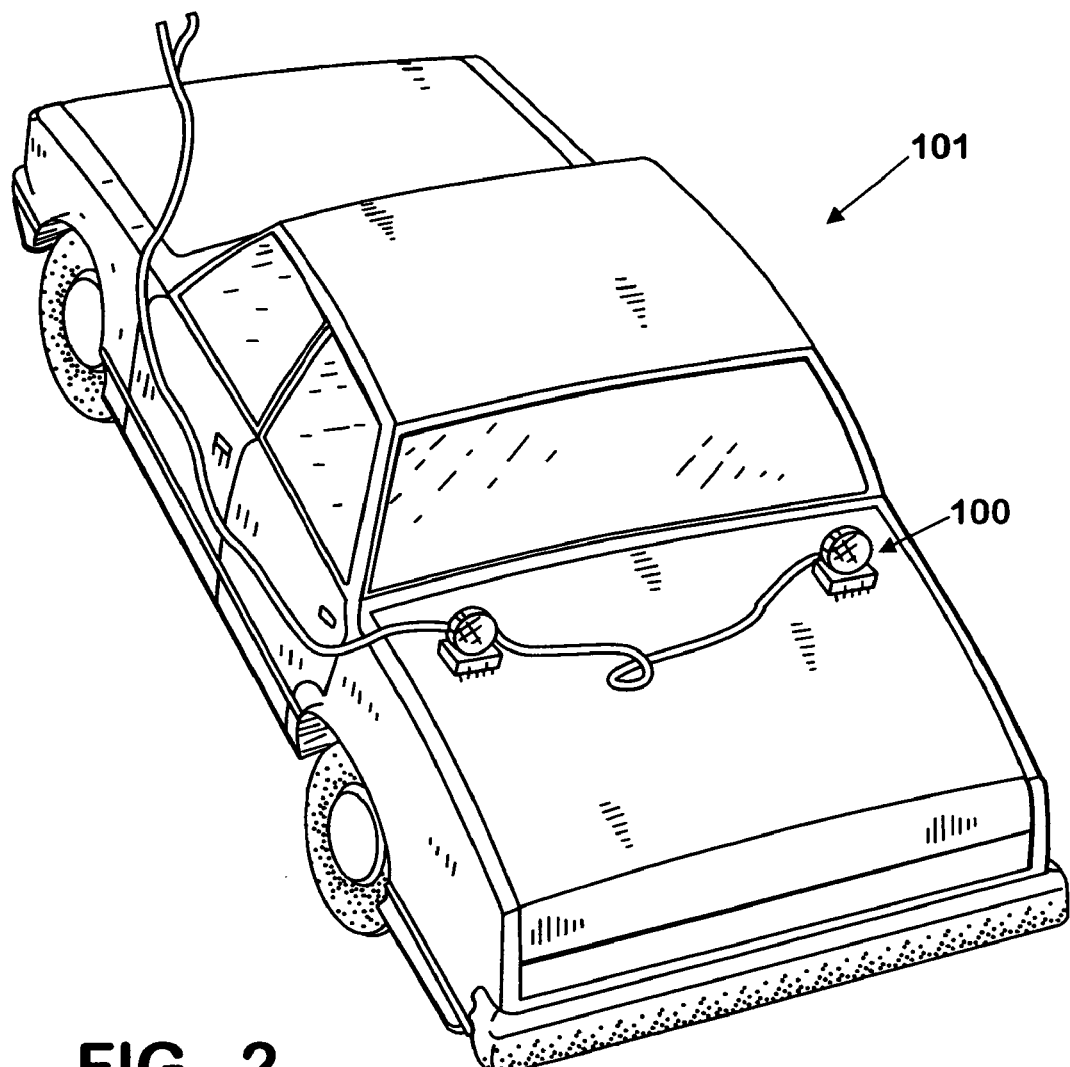
FIG. 2 is a perspective view of a vehicle with a accessory tail lighting system mounted thereon.

FIGS. 1 and 2 illustrate the environment of application of the present invention. A car 101 aligned in tandem with a bus 103 or other towing vehicle is towed by the bus or other towing vehicle. An accessory lighting system 100, providing an array of brake, turn and tail light signals, is mounted on the back of car 101 for alerting drivers following the tandem vehicles of actions of the driver of bus 103. Accessory lighting system may be an installable array as shown, or the existing tail lamp array of the car 101. Accessory lighting system 100 is connected to the electrical system of bus 103 for operation by a cable including a power cable 106 and a twisted pair bus cable 109. Power cable 106 connects to an external power port 108 of the bus 103 and provides a return to chassis ground. Twisted pair bus cable 109 connects to a bus controller area network as described below.

Figure 3:
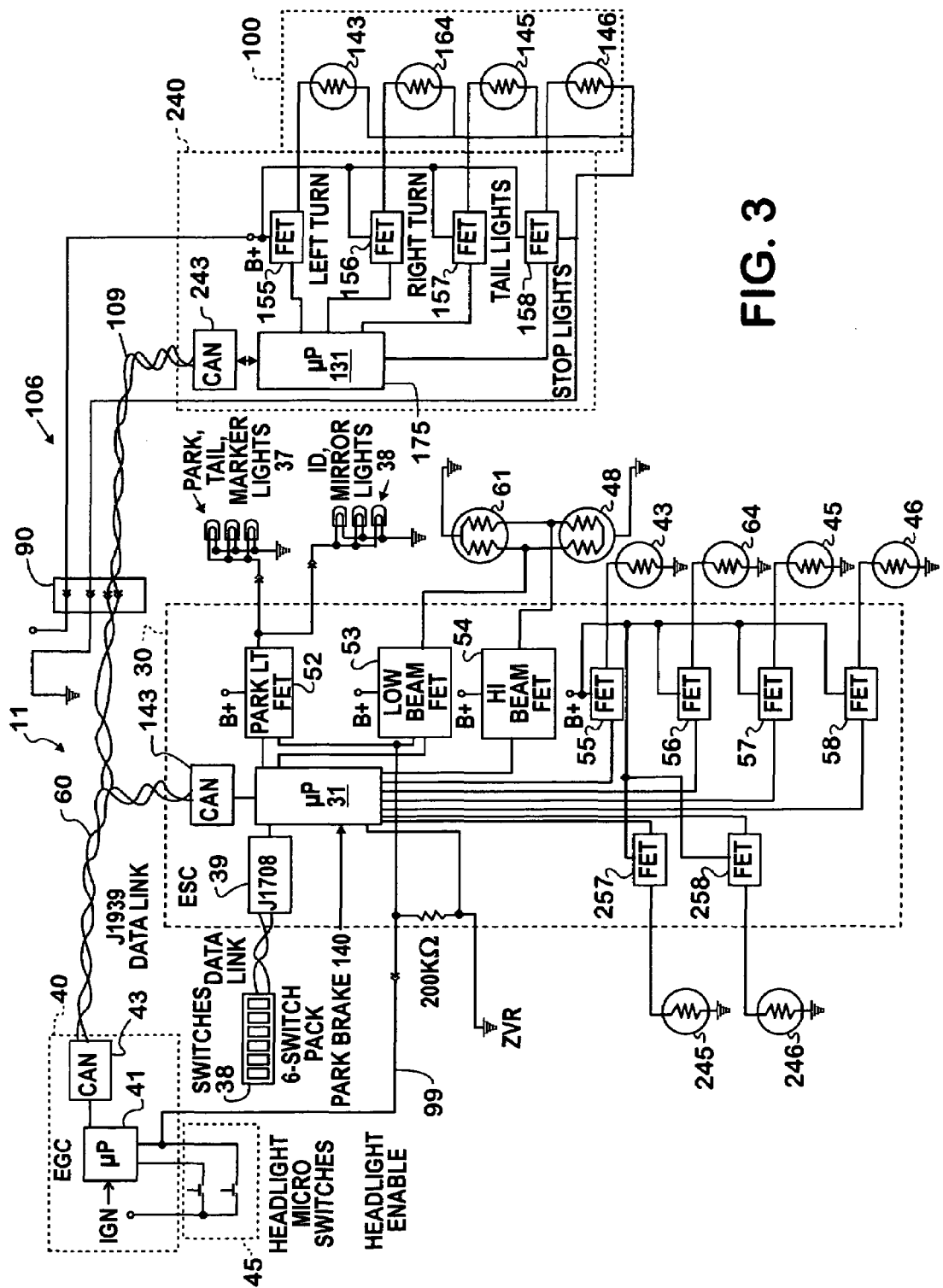
FIG. 3 is a circuit schematic of a control system for the accessory tail lighting system.

Referring now to FIG. 3 a vehicle controller area network (CAN) 11 for the towing vehicle is provided based on an electrical system controller (ESC) 30 and a shielded twisted pair bus 60. Databus 60 carries data communications between ESC 30 and other controllers, including here in particular an electronic gauge controller (EGC) 40. Twisted pair bus cable 109 provides databus extension which is connected to the primary databus 60 over an accessory connector 90 such as a diagnostic port or by replacing a databus terminating impedance fitting and extends in cables from the towing vehicle 103 to the accessory lighting system 100 mounted on the towed vehicle 101. Connected to databus extension 109 is an accessory controller 240. A power connection to the towing vehicle's battery and an electrical return to chassis ground of the towing vehicle are illustrated as being connected through the accessory connector 90, though other provision may be made as shown in FIG. 1. The accessory lighting system 100 in use is made an extension of the towing vehicle's electrical system.

Active vehicle components for the towing vehicle are typically controlled by one of a group of autonomous, vocational controllers (which, except for EGC 40, are not shown here). However, most lamps are powered directly from ESC 30, which includes a number of power switching field effect transistors (FETs) for that purpose. A switch set 45 for some of the lamps is attached to EGC 40, which communicates requests to ESC 30 over bus 60. Less usually, switches (e.g. brake 140) may be directly connected to ESC 30. A switch pack 38 is connected to ESC 30 by a J1708 bus 39. ESC 30 includes a programmable computer 31 including conventional memory (both volatile and non-volatile) and program execution capacities. A headlamp, parking light enable line 99 is attached between the EGC 40 and ESC 30 parallel to bus 60, to provide a common zero volt return connection for the microswitches and appropriate FETs.

EGC 40, ESC 30, and a plurality of lamps 37, 38, 61, 48, 43, 64, 45 and 46 are configured as installed on bus 103. ESC 30 is a programmable body systems computer used to control many vehicle electrical system functions. In the past, many of these functions controlled by ESC 30 where handled by switches, relays and discrete wiring. ESC 30 is based on a microprocessor 31 which executes programs and which controls switching of a plurality of power FETs 52, 53, 55, 56, 57 and 58 used to actuate a vehicle's exterior lamps 37, 38, 61, 48, 43, 64, 45 and 46.

EGC 40 communicates with ESC 30 over an SAE J1939 data link (bus 60) and CAN interfaces 43 and 143, which are part of EGC 40 and ESC 30, respectively. EGC 40 is based on a microprocessor 41 but includes only limited and typically fixed programming. EGC 40 polls for switch 45 inputs and converts those inputs to CAN messages, broadcast over bus 60 by CAN interface 43, thereby providing manual control over various lamps including the headlights 48, 61, tail lamps 37 and, usually, the turn signal lamps. An alternative source of switch inputs may by provided by a switch pack 38 which is connected to microprocessor over an SAE J1708 bus and controller 39 or through switches associated with brake pedals and other similar systems. Typically however, a headlight microswitch and turn signal microswitches are provided in microswitch pack 45 and a brake pedal position signal 140 provide all of the switching inputs required by the current invention. Tail lights 37 are turned on using park light FET 52 in response to closure of a headlight microswitch 45, turn signal lights (any of lights 43, 64, 45 or 46) are activated in response to positioning of an appropriate microswitch 45 using one of FETs 55, 56, 57 or 58, but here typically FETS 55 and 56. Similarly the brake lights can be any one of lights 43, 64, 45 or 46 using one of FETs 55, 56, 57 or 58, but here typically FET 58. Two more FETs 257, 258 may be present for use in combination red stop/turns (US style) or separate (EU style) amber turn lamps with red stop lamps 245, 246. This could also be accomplished via a jumper wire which changes the programming of the turn signal FETs.

ESC 30 responds to inputs from EGC 40, over the J1708 Bus 39 and brake 140 to switch on and off the appropriate FETs to illuminate selected lamps. ESC 30 broadcasts status signals relating to all lamps under its control over bus 60. Any controller can be programmed to respond to such status signals in any manner desired. Control over accessory lamps 100 is effected by a controller 240 providing a CAN interface 243 connected to the bus extension 109, a microprocessor 131 programmed to respond to the status signals provided by the CAN interface and four power FET switches 155, 156, 157 and 158 to which microprocessor 131 provides switching signals. Each of the FETs 155, 156, 157 and 158 is used to echo one system in the tow vehicle, i.e. the left turn signal, the right turn signal, tail lights and stop lights. A flasher function can be implemented using the left and right turn signals concurrently. Signals propagated over bus 60 are coupled to bus 160 over accessory connector 90 for receipt by CAN interface 243 and processing by microprocessor 131, which generates the appropriate control signals for switching on and off FETs 155, 156, 157 and 158, which in turn operate to couple power from the towing vehicle battery to lamps 143, 164, 145 and 146, respectively. Controller 240 and light accessory array 100 are coupled back to the towing vehicle ground. Controller 240 is turned on and off by microcontroller 175. Microcontroller 175 is switched off and on by the battery power connection, and accordingly is illustrated as a switch.

The invention provides for control of an auxiliary lighting system, installable on a towed vehicle, from a towing vehicle which is equipped with a CAN, without comprising the integrity of the towing vehicle's electrical circuitry.

While the invention is shown in only one of its forms, it is not thus limited but is susceptible to various changes and modifications without departing from the spirit and scope of the invention.

What is claimed is:

1. An accessory lighting system for a towed vehicle for control from a towing vehicle, the lighting system comprising:

an array of lamps for the towed vehicle;

a network having a network data bus with an access point installed on the towing vehicle;

a network bus extension attached to the network bus at the access point;

a source of towing vehicle power with an accessible outlet;

a tail light controller installed on the towing vehicle and having direct control over the tail lights for the towing vehicle which is connected to the network data bus for generating vehicle lamp status signals, including tail light status signals, on the network data bus; and a controller provided for connection to the network bus extension, to the array of lamps and to the accessible outlet of towing vehicle electrical power, the controller being responsive to the vehicle lamp status signals for selectively supplying energization to lamps of the array of lamps from the source of towing vehicle electrical power.

2. The lighting system of claim 1, wherein the access point is a diagnostic port.

3. The lighting system of claim 1, wherein the access point is a terminating end of the network bus.

4. The lighting system of claim 1, wherein the array of lamps is installable on the towed vehicle.

5. The lighting system of claim 1, wherein the array of lamps is the existing tail lamp array of the towed vehicle.

6. The auxiliary lighting system of claim 4, further comprising:

power and ground connection cables connected to the controller area network compatable controller and providing a connection point for attachment to the source of external power and an associated ground.

7. The auxiliary lighting system of claim 5, the controller area network compatable controller including, a plurality of power switching circuits, a controller area network interface, a programmable element connected to received messages from the controller area network interface for generating control signals for application to the plurality of power switching circuits.

8. An auxiliary lighting system comprising:

an array of lamps for temporary installation on a vehicle;

a connector for attachment to an access point for a controller area network;

a cable extensible from the connector; and a network compatable controller for the array of lamps connected to the cable for receiving signals thereon and to the array of lamps and having a power connector for connection to an external source of electrical power, the controller area network compatable controller being programmed to respond to status signals on the controller area network relating to lamp status for controlling the on/off status thereof using power from the external source.

* * * * *